United States Patent

Iino

[11] Patent Number: 5,219,218
[45] Date of Patent: Jun. 15, 1993

[54] STOP LIGHT FOR VEHICLE

[75] Inventor: Tadashi Iino, Shizuoka, Japan

[73] Assignee: Yazaki Corporation, Japan

[21] Appl. No.: 834,219

[22] Filed: Feb. 12, 1992

[30] Foreign Application Priority Data

Feb. 15, 1991 [JP] Japan ............... 3-6361[U]

[51] Int. Cl.⁵ ............................................. B60Q 1/44
[52] U.S. Cl. ..................... 362/80.1; 362/74;
362/80; 362/83.1; 362/339; 340/479; 359/831
[58] Field of Search ............... 362/61, 80, 80.1, 83.1,
362/327, 328, 329, 330, 331, 339, 299, 300, 74;
340/468, 479; 296/215, 96.19; 359/831, 833,
837, 838

[56] References Cited

U.S. PATENT DOCUMENTS

| | | | |
|---|---|---|---|
| 2,252,161 | 8/1941 | Borba | 362/74 |
| 2,645,159 | 7/1953 | Darroch | 296/215 |
| 2,675,534 | 4/1954 | Bryant | 340/97 |
| 2,891,140 | 6/1959 | Huff | 362/80 |
| 2,953,062 | 9/1960 | Ford | 359/831 |
| 3,139,616 | 6/1964 | Parsons | 359/831 |
| 3,794,411 | 2/1974 | Gray | 359/831 |
| 4,085,666 | 4/1978 | Ternes | 296/215 |
| 4,488,141 | 12/1984 | Ohlenforst et al. | 362/80.1 |
| 4,791,534 | 12/1988 | Lindberg | 362/80 |
| 4,893,915 | 1/1990 | Taguma | 359/838 |
| 4,916,592 | 4/1990 | Sultan et al. | 362/80 |

FOREIGN PATENT DOCUMENTS

| | | | |
|---|---|---|---|
| 0085479 | 8/1983 | European Pat. Off. | 359/838 |
| 2348206 | 4/1974 | Fed. Rep. of Germany | 359/837 |
| 3526271 | 2/1987 | Fed. Rep. of Germany | 359/831 |
| 0037038 | 3/1982 | Japan | 340/479 |

Primary Examiner—Ira S. Lazarus
Assistant Examiner—Y. Quach
Attorney, Agent, or Firm—Wigman, Cohen, Leitner & Myers

[57] ABSTRACT

A stop light for a vehicle mounted within the vehicle for flashing in synchronism with a brake comprises a light source arranged within the vehicle. A prism is so arranged as to feed a display light from the light source rearward of the vehicle. Further, the prism is so arranged that a driver can confirm a road surface at a rear location of the vehicle through the prism from a field of view of a back mirror. The prism may be formed into such a configuration that a surface thereof adjacent to the light source scatters a light from the light source. Moreover, the light source may be formed by a red light source.

5 Claims, 5 Drawing Sheets

STOP LIGHT FOR VEHICLE

BACKGROUND OF THE INVENTION

The present invention relates to an improvement in stop lights of high mount type for a vehicle and, more particularly, to a stop light for a vehicle which does not spoil a rear field of view of a driver and design of an outer appearance of the vehicle, and which has also a function of rear monitoring.

Conventionally, a stop light of high mount type of a vehicle, which flashes in synchronism with a brake of the vehicle, has been utilized as shown in FIGS. 1 and 2 of the attached drawings.

Specifically, as shown in FIG. 1, the stop light 1 for the vehicle is mounted on a rear ceiling 3 of a vehicle 2. It is possible for a driver of a succeeding vehicle to identify or confirm that a driver of a preceding vehicle depresses a brake, As shown in FIG. 2, the stop light 1 for the vehicle comprises a lamp 5 arranged within a case 4 so as to be directed rearward of the vehicle, a reflector 6 for reflecting a light from the lamp 5, and a color filter 7 of transmission type through which the light from the reflector 6 and the lamp 5 is transmitted rearward of the vehicle. The case 4 is mounted on the rear ceiling 3 of the vehicle 2, and the lamp 5 is connected to a brake switch 9 by a lead wire 8, whereby the lamp 5 flashes in synchronism with the brake switch 9.

Accordingly, the light from the lamp 5, which is turned on by depression of the brake switch 9, is radiated rearward of the vehicle through the transmission type color filter 7 which occupies the entire rear field of view of the case 4, to promote safety confirmation with respect to the driver of the succeeding vehicle.

However, the above-described conventional stop light for the vehicle has the following disadvantages. That is, the lamp 5 is arranged within the case 4 which is mounted on the ceiling 3 at a rear location of the vehicle, and the transmission type color filter 7 is mounted on a rear surface of the case 4. Accordingly, the case 4 is largesized. Not only the case 4 projects downwardly from the ceiling 3 of the vehicle 2, to obstruct or interrupt the rear field of view of the driver, but also presence of the case 4 isolates or cuts off an external light such as a solar light or the like to darken a rear seat within the vehicle. Further, design of an outer appearance of the vehicle is also impeded or hindered.

SUMMARY OF THE INVENTION

It is therefore an object of the invention to provide a stop light for a vehicle, which is capable of preventing obstruction of a rear field of view of a driver and spoiling of the design of an outer appearance of the vehicle, and which also has a rear monitoring function.

In order to achieve the above-described object, according to the invention, there is provided a stop light for a vehicle, mounted within the vehicle for flashing in synchronism with a brake, the stop light comprising:

a light source arranged within the vehicle; and a prism so arranged as to direct a display light from the light source rearward of the vehicle, the prism being so arranged that a driver can confirm a road surface at a rear location of the vehicle through the prism from a field of view of a back mirror.

In the stop light for the vehicle according to the invention, the sue of the prism makes it possible to down-size the case and to incorporate the case into a ceiling of the vehicle. It is possible to considerably enlarge the rear field of view of the driver, while maintaining a function as the stop light for the vehicle.

Further, since the prism is seen through in case of being seen from the outside of the vehicle, the beauty of the outer appearance and the design of the outer appearance of the vehicle are not impeded. Moreover, since the prism does not hinder or cut off the solar light, it is possible to maintain brightness of a rear seat within the vehicle.

Furthermore, the stop light for the vehicle according to the invention serves also a rearward monitoring mirror, because angular disposition of the prism is optimized whereby the driver can identify or confirm the rear of the vehicle through the prism from the field of view of the back mirror.

DETAILED DESCRIPTION OF THE PREFERRED EMBODIMENTS

A stop light for a vehicle, according to the invention, will hereunder be described in detail with reference to the accompanying drawings.

Figure 1:
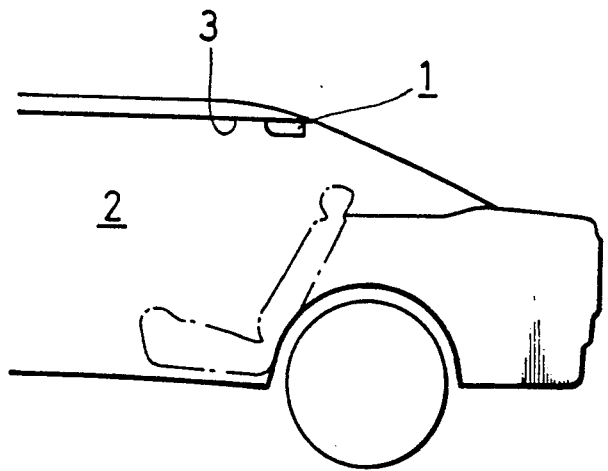
FIG. 1 is a view for explanation showing a rear section of a vehicle on which a conventional stop light for the vehicle is mounted.
Figure 2:
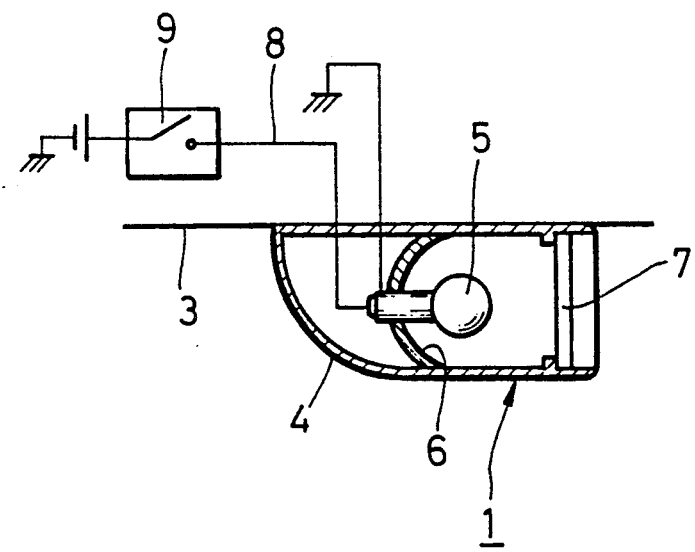
FIG. 2 is a cross-sectional view of the conventional stop light for the vehicle illustrated in FIG. 1.
Figure 3:
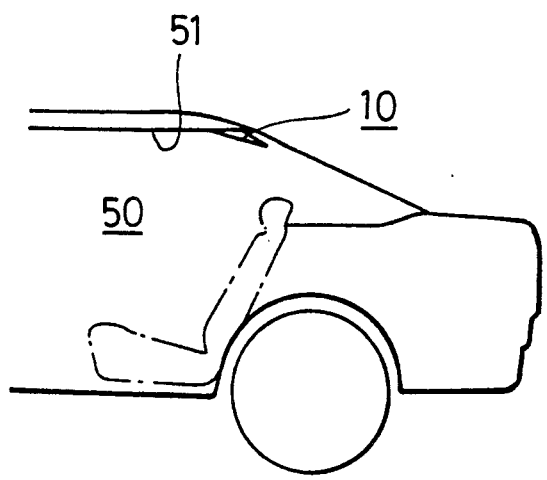
FIG. 3 is a view for explanation showing a rear section of a vehicle on which a stop light for the vehicle according to the invention is mounted.

Referring first to FIG. 3, there is shown a stop light 10 for a vehicle 50, according to the invention. The stop light 10 is mounted on a rear ceiling 51 of the vehicle 50 and performs such a safety function that it is possible for a driver of a succeeding vehicle to identify or confirm when a driver for the vehicle 50 depresses a brake pedal.

Figure 4:
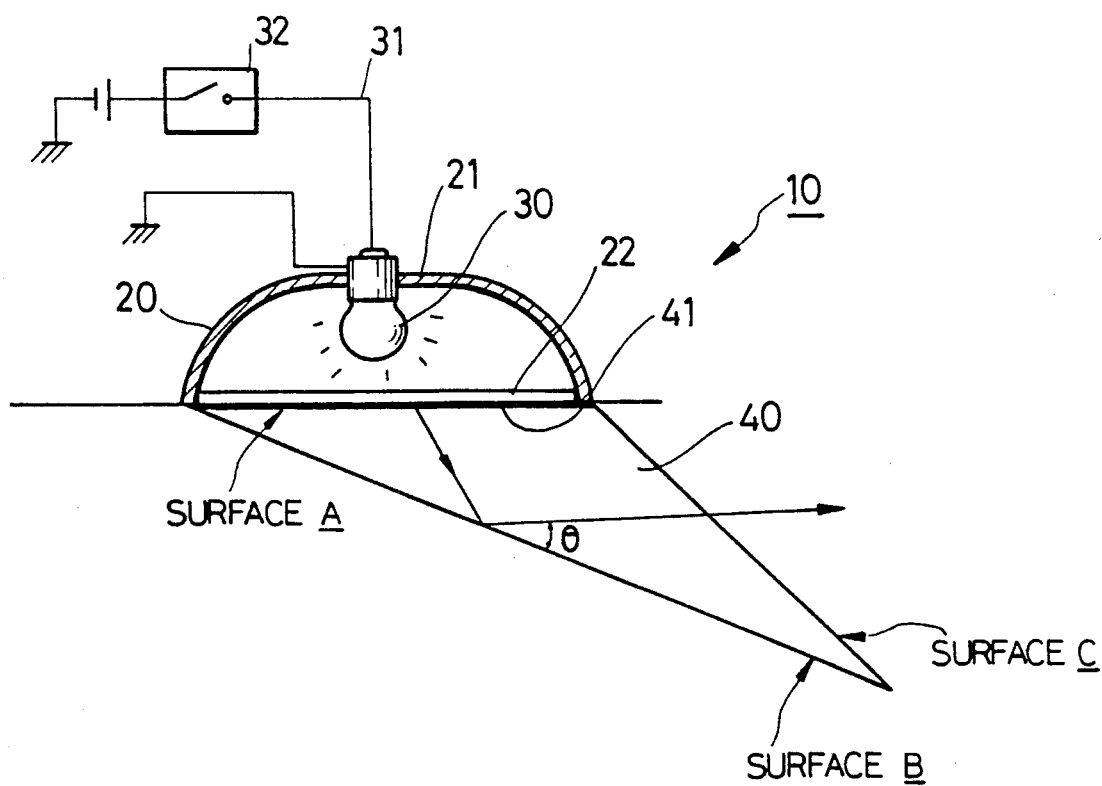
FIG. 4 is a cross-sectional view for explanation showing a first embodiment of the stop light for the vehicle according to the invention.

In a first embodiment illustrated in FIG. 4, the stop light 10 for the vehicle principally comprises a case 20, a lamp 30 arranged within the case 20 and serving as a light source, and a prism 40 arranged at an opening of the case 20 in abutment therewith.

The case 20 has an inner surface on which a reflector 21 is mounted. The case 20 also has an opening at a surface of a lower portion. A scattering plate 22 is arranged at the opening in the case 20.

The lamp 30 is arranged within the case 20 and is directed downwardly. The lamp 30 is connected to a brake switch 32 by a lead wire 31.

Accordingly, the lamp 30 is turned on and off or flashes in synchronism with the brake switch 32.

The prism 40 is triangular in cross-sectional configuration, and has one face which is arranged in abutment adjacent to the scattering plate 22 of the case 20.

The prism 40 has a surface A adjacent to the scattering plate 22, and a red painting layer (a red transparent material) 41 is applied to the surface A. Angular disposition of the prism 40 is optimized such that a red light (display light) incident upon through the red painting layer 41 from the scattering plate 22 is reflected in refraction by a surface B of the prism 40, and the reflected light is radiated rearward of the vehicle from a surface C of the prism 40.

Accordingly, when the lamp 30 is turned on by turning-on of the brake switch 32, a light of the lamp 30 is condensed to the scattering plate 22 by the reflector 21. The condensed scattering light is brought to the red light by the red-light painting layer 41 of the prism 40, and is reflected in refraction by the surface B of the prism 40, and the reflected light is radiated rearward of the vehicle through the surface C of the prism 40 in a direction indicated by an arrow. Accordingly, it is possible for the driver of the succeeding vehicle to confirm safety by red tuning-on display in a higher location of the preceding vehicle.

With the arrangement described above, the lamp 30 is arranged within the case 20 and is directed downwardly. However, the light from the lamp 30 can be reflected rearward of the vehicle by the prism 40. Accordingly, it is possible to miniaturize or down-size the case 20, and it is possible to incorporate the case 20 to a location within the rear ceiling 51 of the vehicle 50, as shown in FIG. 3. Accordingly, the rear field of view of the driver can considerably be enlarged while a function as the stop light 10 is maintained good or superior.

Figure 5:
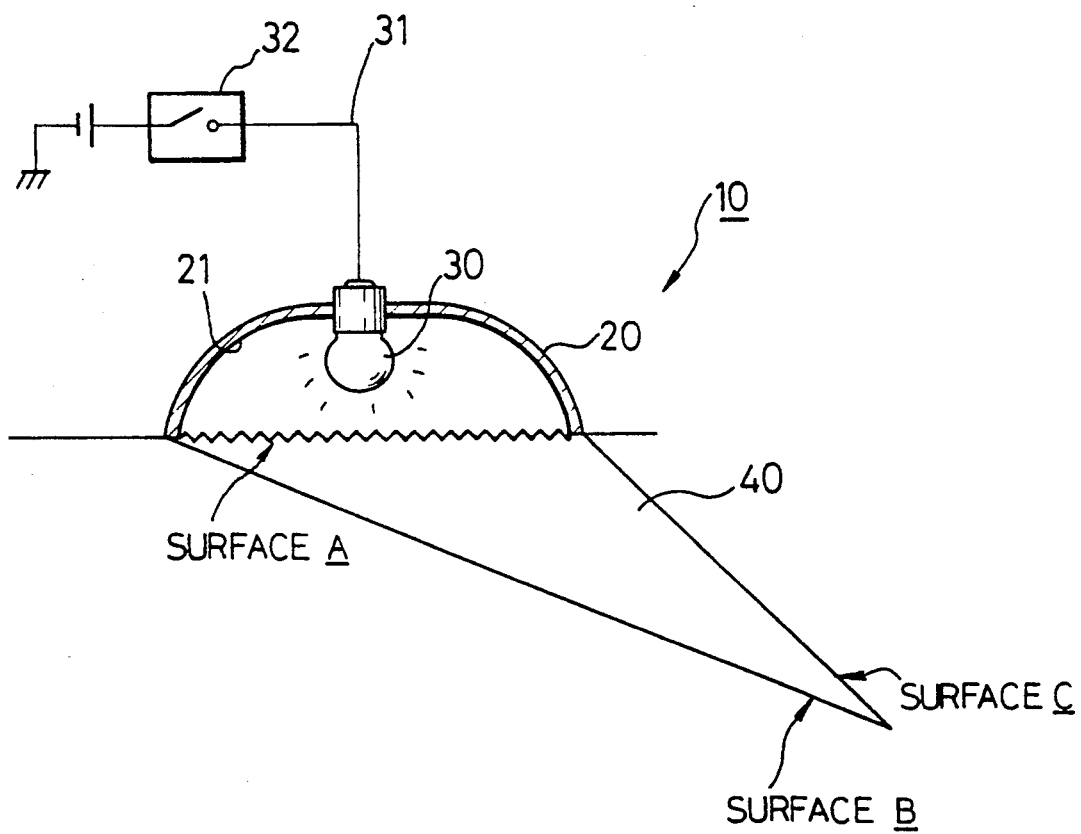
FIG. 5 is a cross-sectional view showing a second embodiment.

Next, a second embodiment shown in FIG. 5 is different from the above-described first embodiment in that the configuration of the surface A of the prism 40 adjacent to the lamp 30 is formed into shape which scatters the light from the lamp 30, whereby the use of the scattering plate 22 is omitted.

Further, the second embodiment is also different from the first embodiment in that the lamp 30 is a red lamp, whereby the red painting layer 41 on the surface A of the prism 40 is omitted.

Specifically, in the second embodiment, an irregular configuration so-called "diamond-cut" is formed on the surface A of the prism 40 adjacent to the lamp 30, whereby a function as a scattering plate is applied to the prism 40 per se. With this arrangement, an attempt can be made to reduce the number of parts. Furthermore, in the invention, a positional relationship between the prism 40 and the back mirror in a driver seat of the vehicle 50 is optimized whereby the prism 40 can serve also as a role of a rear monitoring mirror. With the prism 40 serving as the rear monitoring mirror, a rear field of view of the driver is further enlarged, making it possible to improve safety.

Figure 6:
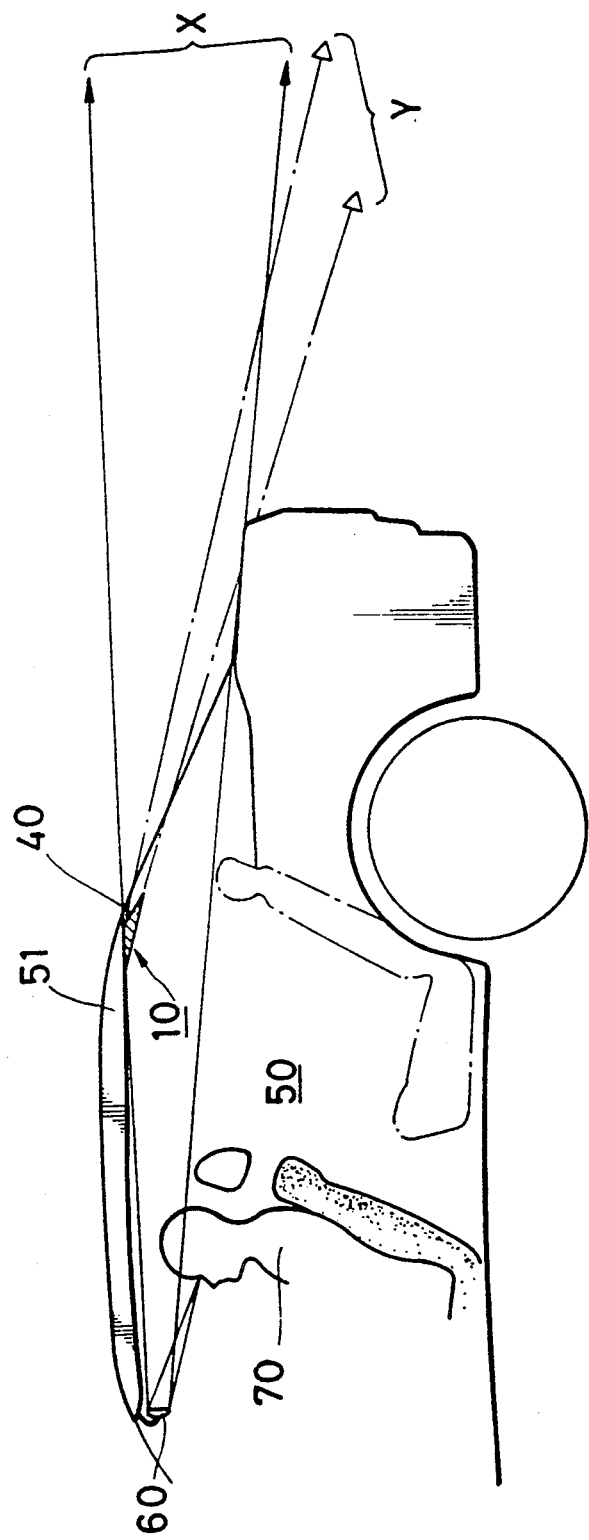
FIG. 6 is a view for explanation showing a rear field of view of a driver due to a back mirror and a prism in the vehicle comprising the stop light for the vehicle according to the invention.
Figure 7:
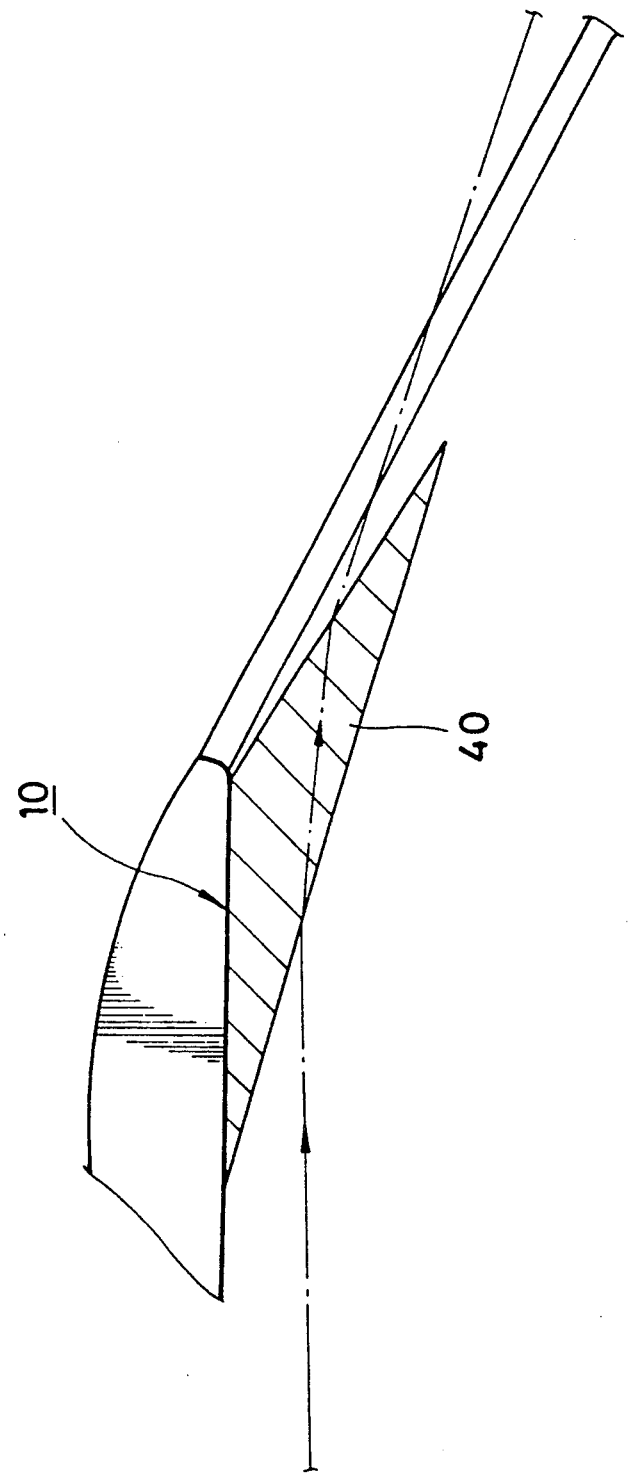
FIG. 7 is an enlarged view for explanation of the rear field of view due to the prism illustrated in FIG. 6.

Specifically, as shown in FIGS. 6 and 7, a back mirror 60, which is provided for the fact that a driver 70 in a driver's cab confirms the rear, is arranged substantially in parallel with the prism 40 of the stop light 10 for the vehicle, whereby the driver 70 can grasp both a rearward field of view X due to the back mirror 60 and a rear road-surface field of view Y due to seeing of the prism 40 from the back mirror 60. Thus, for example, it is possible to easily judge confirmation of presence of an obstruction on a rear road-surface, and the like, through the back mirror 60.

Accordingly, according to the stop light for the vehicle of the invention, not only it is possible to enlarge the rear field of view of the driver while maintaining a function as the stop light, but also the stop light serves as the rear monitoring mirror with respect to the stop light for the vehicle. Thus, it greatly contributes to traffic safety.

What is claimed is:

1. A stop light for a vehicle, mounted within the vehicle for flashing in synchronism with a brake, said stop light comprising:
   a light source arranged within a ceiling of said vehicle;
   said ceiling having a front, a rear, and connecting side edges therebetween; and
   a prism mounted adjacent the rear ceiling of said vehicle, said prism so arranged as to direct a display light from said light source rearward of the vehicle, said prism being so arranged that a driver can confirm a road surface at a rear location of the vehicle through said prism from a field of view of a back mirror.

2. A stop light for a vehicle, according to claim 1, wherein said prism is formed into so configuration that a surface thereof adjacent to said light source scatters a light from said light source.

3. A stop light for a vehicle, according to claim 1, wherein said light source is formed by a red light source.

4. A stop light for a vehicle, according to claim 1, wherein a red transparent material adheres to a surface of said prism adjacent to said light source.

5. A stop light for a vehicle according to claim 1, wherein said prism is a triangular prism.

* * * * *

UNITED STATES PATENT AND TRADEMARK OFFICE
CERTIFICATE OF CORRECTION

PATENT NO. : 5,219,218
DATED : June 15, 1993
INVENTOR(S) : Tadashi Iino

It is certified that error appears in the above-indentified patent and that said Letters Patent is hereby corrected as shown below:

Column 1, line 68, "sue" should be --use--.

Column 4, claim 1, line 33, after "rear" insert --edge of said--.

Signed and Sealed this

Twenty-second Day of February, 1994

*Attest:*

BRUCE LEHMAN

*Attesting Officer*     *Commissioner of Patents and Trademarks*